United States Patent [19]

Rizk et al.

[11] 4,367,313

[45] Jan. 4, 1983

[54] COATING COMPOSITION AND METHOD

[75] Inventors: Sidky D. Rizk, Westfield; Navinchandra B. Shah, Oldbridge, both of N.J.

[73] Assignee: Essex Chemical Corporation, Clifton, N.J.

[21] Appl. No.: 272,270

[22] Filed: Jun. 10, 1981

[51] Int. Cl.$^3$ .................. C08L 37/00; C08L 39/00; C08L 75/00

[52] U.S. Cl. .................................. 525/102; 525/103; 525/127

[58] Field of Search ........................ 525/101, 102, 103

[56] References Cited

U.S. PATENT DOCUMENTS

| | | | |
|---|---|---|---|
| 3,037,006 | 5/1962 | Hankins et al. | 260/80.5 |
| 3,743,626 | 7/1973 | Emmons | 260/77.5 AQ |
| 3,779,794 | 12/1973 | De Santis | 117/72 |
| 4,146,585 | 3/1979 | Ward et al. | 260/827 |

OTHER PUBLICATIONS

Journal of Coatings Technology 49, 65–73 (1977).
Rohm & Haas Company Product Bulletin RD-129 (1975).

Primary Examiner—Wilbert J. Briggs, Sr.
Attorney, Agent, or Firm—Curtis, Morris & Safford

[57] ABSTRACT

What are disclosed are a "one pot" moisture-curable two-component coating composition comprising a first component having at least one isocyanate group and at least one hydrolyzable alkoxysilane group therein and a second component having at least one oxazolidine group therein, methods of forming a tenacious coating therewith on non-porous substrates such as glass and of further applying a resinous sealant composition over such a tenacious coating used as a primer, and coated substrates having such a tenacious coating thereon without or with a further resinous sealant composition.

9 Claims, No Drawings

COATING COMPOSITION AND METHOD

The present invention relates to coating compositions, to methods for forming coatings with said compositions on a substrate, and to such coated substrates.

U.S. Pat. No. 3,743,626 to Emmons granted July 3, 1973 discloses in considerable detail moisture-curable compositions comprising a polyfunctional aliphatic or aromatic isocyanate and an oxazolidine. The compositions are taught as useful in forming films, fibers, paints, coatings, impregnants, adhesives, etc.

According to the patent, which is incorporated herein by reference, the isocyanates employed are polyfunctional and have at least two NCO groups. Isocyanate prepolymers, which are prepared by the reaction of a polyol or other compound having polyfunctional active hydrogen atoms with an excess of a diisocyanate or polyisocyanate, are also taught as useful in the prior art compositions. Numerous polyfunctional isocyanates are identified in the patent.

The second component of the prior art composition is a compound having at least one oxazolidine group of the formula

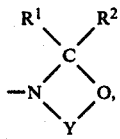

wherein $R^1$ is hydrogen, phenyl, benzyl, or $C_1$-$C_{12}$ alkyl, $R^2$ is hydrogen or $C_1$-$C_4$ alkyl, or
$R^1$ and $R^2$, taken together with the carbon atom to which they are attached, form a saturated 5- or 6-membered carbocycle,
Y is

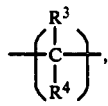

wherein $R_3$ and $R_4$ are each hydrogen, $C_1$-$C_{10}$ alkyl, $C_6$-$C_{10}$ aryl, $C_1$-$C_{12}$-aralkyl or alkaryl, and
n is 2 or 3. A wide variety of suitable oxazolidine compounds are disclosed in the aforementioned patent, including polyfunctional polyol ester oxazolidines, polyfunctional polycarboxylic ester oxazolidines, polymers and copolymers of oxazolidinylalkyl acrylates and methacrylates, and oxazolidines derived from triamines, tetramines, and other polyamines.

The compositions of the prior art contain the polyfunctional isocyanate and oxazolidines in a molar ratio between about 1:10 and about 100:1. The compositions are moisture-curable, two-component, "one pot," compositions which cure in the presence of moisture, such as atmospheric moisture. Moisture causes hydrolysis of the oxazolidine ring with the formation of isocyanate-reactive hydroxy and amino groups, the presence of which initiates the curing of the polyisocyanate.

The present invention relates to moisture-curable coating compositions like those disclosed in the aforementioned Emmons patent, but in which the isocyanate component, in addition to containing at least one isocyanate group, contains at least one hydrolyzable alkoxysilane group. The alkoxysilane groups also hydrolyze in the presence of moisture, ultimately with the formation of cross-linking siloxane groups (—Si—O—Si—), perhaps by way of an intermediate silanol. In addition to effecting crosslinking between the polymer molecules further to that brought about by the hydrolyzed oxazolidine compound, the hydrolysis of the alkoxysilane groups promotes tenacious adhesion of the resulting cured polymeric compositions to non-porous substrates, particularly inorganic substrates such as metal and glass, and particularly to glass. As a result, the cured coating compositions of the present invention bond tenaciously to such non-porous substrates, particularly glass, with the formation of coatings which are exceptionally resistant to influences detrimental to other coatings of this type. Thus, for example, the compositions of the present invention can be used to form steam-resistant protective or decorative coatings on glass, which coatings can be made to be resistant to boiling water for periods as long as 24 hours.

In addition, the coating compositions of the present invention can be used as primers on non-porous surfaces such as metal or glass to promote the subsequent adhesion, to the surface, of a resinous material. Thus, for instance, the compositions of the present invention can be used to coat glass fibers in a simple method involving a room temperature cure. The fibers can then subsequently be incorporated into resinous compositions as reinforcing agents. The use of such fibers, primed according to the present invention, in tires is specifically contemplated. The coating compositions of the present invention find other uses in the automotive industry, for example as primers used on windshields and other automotive glass prior to bonding of the blass into an automotive structure with polymeric sealant compositions, for example those comprising a polyurethane polymer as a principal ingredient. Suitable sealant compositions of this type are taught in U.S. Pat. No. 3,779,794, for instance, the contents of which are incorporated herein by reference.

That component of the coating compositions of the present invention containing both isocyanate and silane functionalities is suitably prepared by the reaction of a compound having two or more active hydrogen atoms per molecule with an isocyanato functional alkoxysilane having one isocyanate group per molecule and also having an alkoxysilane terminal group containing one to three hydrolyzable alkoxy groups. Preferably, if the polyactive hydrogen compound has n active hydrogen atoms therein per molecule, it is reacted with (n−1) equivalents of the isocyanate compound. The other, remaining, active hydrogen atoms ae then subsequently reacted with a polyisocyanate having at least two isocyanate groups to introduce an active isocyanate group into the compound.

The preferred polyactive hydrogen compounds of the present invention are polyols containing two or more hydroxy groups. The polyols may be relatively small monomeric or oligomeric compounds such as ethylene glycol, di-, tri-, or tetraethylene glycols, butane diols, hexane diols, and trimethylol propane, and may include other groups therein, such as do triisopropanol amine and N,N,N',N'-tetrakis (2-hydroxypropyl) ethylene diamine.

Suitable linear polyether polyols have the formula

wherein R is alkylene having two or more carbon atoms and n is an integer. Typical of such materials are those prepared by the homopolymerization or copolymerization of ethylene oxide and propylene oxide. Glycols prepared by the polymerization of heterocyclic ethers can also be used. For example, the polymerization of tetrahydrofuran yields a polytetramethylene ether glycol.

Other suitable polymers are polyester polyols derived from the reaction of an excess of a glycol or oligomeric diol such as polypropylene glycol with a dicarboxylic acid, alone or in the presence of higher functional carboxylic acids such as tricarboxylic acids. Suitable acids include adipic, succinic, sebacic, and the isomeric phthalic acids.

Lactones such as epsilon caprolactone can be polymerized to yield polycaprolactone polyester polyols.

Other polyols include castor oil and derivatives thereof prepared by the reaction of castor oil with alkylene oxides to form polyether polyols.

Still other polyols useful according to the present invention are polyhydroxy polysulfide polymers of the formula $$HO-X-SS-(Y-SS)_n-X-OH,$$

wherein X and Y are divalent aliphatic groups and n is an integer between 1 and 100.

The polyols or mixtures of polyols employed according to the present invention may have a wide range of hydroxy equivalent weights varying between 50 and 2,000, preferably between 60 and 400.

One or more hydroxy groups of such a polyol are reacted according to the invention with an isocyanato functional alkoxysilane having one or more hydrolyzable alkoxy groups therein. Such compounds have the formula $$OCN-R-Si(X)_m(R')_{3-m},$$

wherein R is a divalent organic radical, R' is hydrogen or alkyl having 1 to 4 carbon atoms, for instance, X is a hydrolyzable alkoxy group having from 1 to 4 carbon atoms, for instance, and m is an integer from 1 to 3. Group R can have any of a wide variety of structures forming a stable bridge between the isocyanate group and the alkoxysilane group. A number of such structures are illustrated in columns 4 and 5 of U.S. Pat. No. 4,146,585, incorporated herein by reference. Preferably, however, R is a lower alkyl group having at least three carbon atoms therein. A particularly preferred material is gamma-isocyanatopropyl-triethoxysilane, i.e.

$$(C_2H_5O)_3Si-(CH_2)_3-N=C=O.$$

The reaction between the polyol and the isocyanate-containing alkoxysilane is preferably carried out under anhydrous conditions, for example under a nitrogen blanket, to avoid hydrolysis of the alkoxysilane groups and to protect unreacted isocyanate groups from reaction with moisture. The reaction between the polyol and the isocyanate can take place at a temperature between 0° C. and 150° C., preferably between 25° C. and 80° C., and is carried out until no isocyanate groups can be detected in the reaction mixture by infrared analysis. The reaction is usually carried out in the presence of a catalyst promoting the formation of urethanes. Such catalysts are known in the art and include, for instance, the stannous salts of carboxylic acids such as stannous octoate, stannous oleate, stannous acetate, or stannous laurate. Other catalysts include the dialkyltin dicarboxylates such as dibutyltin dilaurate or dibutyltin diacetate. Still other catalysts include the tertiary amines and tin mercaptides. Such catalysts are generally present in an amount from 0.005 to 5 percent by weight of the isocyanate.

As mentioned earlier, the isocyanate is reacted with the polyol in an amount of at least about (n−1) equivalents, where n is the number of equivalents of active hydrogen atoms, e.g. of hydroxyl groups, present in the polyactive hydrogen compound.

The resulting reaction product, containing on the average of one or less than one active hydrogen atom, such as in an hydroxy group, is next reacted with a polyisocyanate having at least two isocyanate groups per molecule in order to introduce an isocyanate group into the final product.

The reaction is carried out under anhydrous conditions for the reasons indicated above and in the presence of a catalyst suitable for the formation of urethanes, as discussed above. The reaction conditions are similar to those described immediately above for the reaction of the isocyanate group of the silane with active hydrogen atoms.

The organic polyisocyanates may be aliphatic, cycloaliphatic or aromatic polyisocyanates, or mixtures thereof. A wide variety of such polyisocyanates are discussed in the aforementioned Emmons patent U.S. Pat. No. 3,743,626, for instance. Materials particularly suitable for use in the present invention include 3-isocyanatomethyl-3,5,5-trimethyl-cyclohexylisocyanate (isophorone diisocyanate), 2,4- and 2,6-toluene diisocyanate, 4,4'-diphenylmethanediisocyanate(MDI), hexamethylene diisocyanate (HMDI), dicyclohexyl-4,4'-methane diisocyanate, and p-phenylene diisocyanate. Particularly preferred for use in the present invention ae triisocyanates containing biuret groups obtained by reacting three moles of hexamethylene diisocyanate with one mole of water. Such polyisocyanates are commercially available, for instance, under the tradename "Desmodur 100" and have the idealized structure

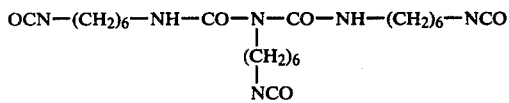

Other suitable materials are polyisocyanates containing isocyanurate groups and having a functionality between 3 and 4, prepared by cyclizing isophorone diisocyanate to form an isocyanurate. Such materials are available commercially under the tradename "IPDI-T-1980," for instance, and have the idealized structure

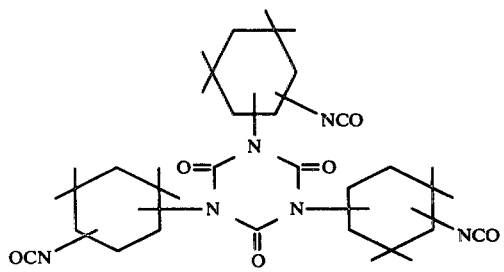

Finally, mixtures of these preferred materials can be used.

The isocyanate is preferably reacted with the polyol, now containing silane groups, in an amount slightly in excess of the amount equivalent to the hydroxy groups in the polyol, whereby complete reaction of unreacted hydroxy groups is assured.

The second component of the composition of the present invention, having at least one oxazolidine group therein, is preferably a polymer or copolymer of an oxazolidinylalkyl-acrylate and/or -methacrylate of the type particularly disclosed in Hankins et al. U.S. Pat. No. 3,037,006, incorporated herein by reference. These polymers and copolymers comprise a monomer of the formula

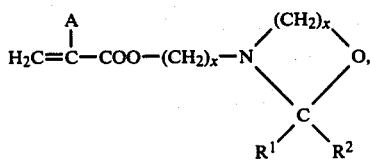

wherein A is hydrogen or methyl, x is 2 or 3, and $R^1$ and $R^2$ have the meanings earlier discussed herein with respect to Emmons U.S. Pat. No. 3,743,626. Namely, $R^1$ is hydrogen, phenyl, benzyl, or $C_1$–$C_{12}$ alkyl, $R^2$ is hydrogen or $C_1$–$C_4$ alkyl, or $R_1$ and $R^2$, taken together with the carbon atom to which they are attached can form a saturated 5- or 6-membered carbocycle. A preferred monomer of this type is 2-(1,3-oxazolidin-3-yl) ethyl methacrylate and is preferably polymerized with one or more other lower alkyl acrylates or methacrylates having from 1 to 18 carbon atoms in the alkyl portion thereof, suitably such that the copolymer contains from 0.5 to 99.5 percent by weight of the oxazoladinyl monomer and from 99.5 to 0.5 percent by weight of other ester monomer. The copolymers may additionally contain other comonomers such as styrene. A number of copolymers of this type are shown in the aforementioned Hankins et al. patent and as compounds X–XIII in patent 3,743,626, wherein the remaining components are methyl methacrylate, butyl methacrylate, and butyl acrylate, with or without the addition of styrene. The copolymers contain the oxazolidinyl methacrylate monomer in amounts from 10 to 15 percent by weight. Copolymers of this type are commercially available, for example under the tradename "Acryloid AU 568" and "Acryloid AU 697."

The oxazolidine ring in compounds of this type is in equilibrium with water and formaldehyde as follows:

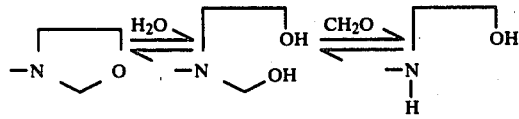

with the three species being in a ratio of 99:0.5:0.5 at equilibrium. Thus, the polymer and the coating composition containing it are relatively stable and are not easily activated prematurely by trace amounts of moisture. When isocyanate groups are present in the system, they react readily with the active hydrogen atoms generated by the partial hydrolysis of the oxazolidine ring. Of the two active hydrogens generated by the hydrolysis of the oxazolidine ring, the amine hydrogen, being more reactive, reacts first with the isocyanate, followed by a slower reaction with the less reactive hydroxyl hydrogen, e.g.

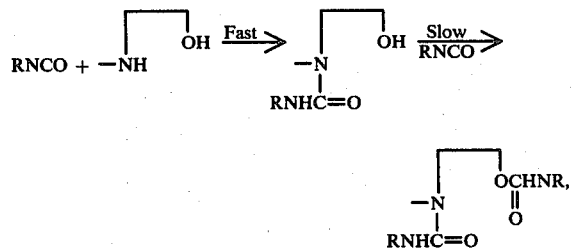

thus forming a compound having both urea and urethane groups.

The oxazolidine compound thus acts as a latent crosslinking agent for the other component of the composition containing isocyanate groups and is preferably admixed with the isocyanate-containing component in amounts such that the active hydrogen atoms generated by hydrolysis of the oxazolidine ring are approximately equivalent to the number of isocyanate groups in the component containing both isocyanate and alkoxysilane groups. However, the oxazolidine compound may be present in amounts such that the number of equivalents of active hydrogen atoms therein to the equivalents of NCO groups is as high as 2:1, or may be present in much smaller amounts, for example 0.5:1, in which case crosslinking of the composition proceeds primarily by the formation of siloxane bridges.

The formation of siloxane bridges by hydrolysis of the hydrolyzable alkoxysilane groups, and consequently the rate of crosslinking, may be accelerated by the presence of a catalyst known to promote the formation of siloxane bridges. These materials, known in the art, include metal salts of carboxylic acids, particularly the tin salts thereof, organosilicon titanates, alkyltitanates, and the like. According to the present invention, dibutyltin diacetate is a preferred material. The catalyst may be present in amounts ranging from 0.1 to 1 percent, preferably between 0.2 and 0.6 percent, by weight of the alkoxysilane prepolymer.

The two components of the coating compositions of the present invention can be mixed together to form a two-component, "one pot," system which is stable as long as moisture is excluded. On exposure to moisture, particularly in the presence of isocyanate groups, hydrolysis of the oxazolidine ring to effect crosslinking of the free isocyanate groups and hydrolysis of the alkoxysilane groups to cause cross-linking of the polymer or bonding to an inorganic non-porous surface, such as of glass, will occur.

The cured composition, having a resinous nature, is compatible with other resinous compositions, such as moisture-curable polyurethane compositions. Hence, the coating composition of the invention has particular utility as a primer, for example on glass, for other such resinous materials, particularly polyurethanes.

The compositions of the present invention can be compounded with fillers and additives which are conventional for elastomers to modify properties such as viscosity, flow rate, and the like. To preclude premature crosslinking, such fillers and additives are thoroughly dried before incorporation into the compositions. Exemplary of such materials are carbon black, titanium dioxide, surface-treated silicas, ultraviolet stabilizers, anti-oxidants, and the like. These materials are well known to those skilled in the art of compounding elastomeric resinous compositions and the aforementioned list is by no means exhaustive.

A better understanding of the present invention and of its many advantages will be had by referring to the following specific Examples, given by way of illustration.

EXAMPLE 1

One molar part of a polycaprolactone triol having an average molecular weight of about 300 is combined with 2.05 molar parts of gamma-isocyanatopropyl-triethoxysilane in a 4-necked glass reaction flask equipped with a stirrer, thermometer, dry nitrogen inlet, reflux condenser, and heating mantle. The materials are reacted under a nitrogen blanket at 70°–80° C. in the presence of 25 ppm of dibutyltin dilaurate until no isocyanate groups can be detected by infrared analysis.

Subsequently, a 70% solution of a polyisocyanate containing an isocyanurate ring and having an isocyanate functionality between 3 and 4, derived from isophorone diisocyanate and commercially available under the tradename "IPDI-T-1890," is added in an amount providing three equivalents of isocyanate. An additional 50–75 ppm of dibutyltin dilaurate catalyst are added and the materials are reacted at 70°–80° C. for two hours under nitrogen.

The final product has an isocyanate content of 4.4 percent. The solids content is 89 percent, the balance being the solvent introduced with the isocyanate.

EXAMPLE 2

Example 1 is repeated employing one molar part of a polycaprolactone triol having an average molecular weight of 540.

The free isocyanate content of the reaction product is 4.3 percent. Total solids are 86 percent.

EXAMPLE 3

Example 1 is repeated but one molar part of trimethylolpropane is substituted for the polycaprolactone triol.

The reaction product has an isocyanate content of 4.75 percent and a solids content of 85 percent.

EXAMPLE 4

Using the apparatus of Example 1, one molar part of N,N,N',N'-tetrakis(2-hydroxypropyl)-ethylene diamine of the formula

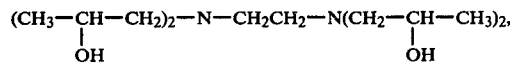

three molar parts of gamma-isocyanatopropyl-triethoxysilane, and 14 drops of dibutyltin dilaurate were reacted. The reaction temperature is 80° C.: after two hours, no isocyanate could be detected by infrared.

Subsequently, the cyclic "IPDI-T-1890" supplying three equivalents of isocyanate and additional tetrahydrofuran as a solvent were introduced into the reaction vessel and the mixture was reacted by refluxing for 25 hours.

The resulting reaction product had an isocyanate content of 1.2 percent and a solids content of 30 percent.

EXAMPLES 5–8

Coating compositions according to the present invention were prepared by compounding the adducts of Examples 1–4 with a copolymer of 2-(1,3-oxazolidin-3-yl) ethyl methacrylate commercially available under the tradename "Acryloid AU-568" and a solvent. The oxazolidine copolymer has an equivalent weight of 265 (based on solids) and is supplied in the form of an 85 percent solution in 2-ethoxyethyl acetate. That is, 265 g of the copolymer, on reacting with moisture, are capable of generating one equivalent of active hydrogen atoms, whether amine hydrogen or hydroxyl hydrogen.

|  | Example 5 | Example 6 | Example 7 | Example 8 |
|---|---|---|---|---|
| Adduct of Ex. 1 | 100 grams | — | — | — |
| Adduct of Ex. 2 | — | 100 grams | — | — |
| Adduct of Ex. 3 | — | — | 100 grams | — |
| Adduct of Ex. 4 | — | — | — | 100 grams |
| "Acryloid Au-568" | 29 grams | 32 grams | 35 grams | 9 grams |
| Methyl ethyl ketone | 99 grams | 97 grams | 95 grams | — |

EXAMPLES 9–12

Similar coating compositions were prepared from the adducts of Examples 1–4 and a similar copolymer comprising 2-(1,3-oxazolidin-3-yl)ethyl methacrylate commercially available under the tradename "Acryloid AU-697" having a higher equivalent weight of 462, again based on solids.

|  | Example 9 | Example 10 | Example 11 | Example 12 |
|---|---|---|---|---|
| Adduct of Ex. 1 | 100 grams | — | — | — |
| Adduct of Ex. 2 | — | 100 grams | — | — |
| Adduct of Ex. 3 | — | — | 100 grams | — |
| Adduct of Ex. 4 | — | — | — | 100 grams |
| "Acryloid AU-697" | 77 grams | 86 grams | 95 grams | 25 grams |
| Methyl ethyl ketone | 86 grams | 83 grams | 80 grams | — |

EXAMPLE 13

The coating composition of Example 5 was applied to detergent-cleaned 1"×3" glass slides by dipping to form a coating approximately 5 mils in thickness. The coating dried to the touch in 10 minutes and developed good adhesion within 48 hours. Adhesion was tested by cross-hatching the coating with "Scotch" brand adhesive tape and then removing the tape. Good adhesion is indicated by a failure of the tape to remove the coating from the glass substrate.

The coating continued to cure slowly and, after one week of curing at room temperature, the coated glass slides were subjected to the following tests.

(1) Some slides were suspended in a humidity chamber for six weeks at 38° C. at 100% relative humidity.

(2) Some slides were boiled in water for 24 hours.

(3) Some slides were boiled under pressure in a pressure cooker for four hours at approximately 115° C.

(4) Slide samples were submitted to 25 regular dishwashing cycles using a commercial household dishwashing detergent.

(5) Test slides were exposed for 2,000 hours to ultraviolet light at 180° F. and 100% relative humidity, followed by soaking in water at room temperature for 24 hours.

In each of these five tests, the extreme conditions of temperature, humidity, and exposure to ultraviolet had no detectable effect on the adhesion. That is, in each case, the coating was resistant to removal from the glass substrate when attempted to be removed therefrom using the adhesive tape test described earlier.

EXAMPLES 14–15

These Examples illustrate the use of the coating compositions of the invention as a primer for a polyurethane sealant applied thereover.

The following primer compositions were prepared:

| Component | Example 14 | Example 15 |
|---|---|---|
| Adduct of Ex. 1 | 170 pbw | 170 pbw |
| Oxazolidine copolymer ("Acryloid AU 568") | 55 | — |
| Oxazolidine copolymer ("Acryloid AU 697") | — | 148 |
| Carbon black | 66 | 78.2 |
| Methyl ethyl ketone | 239 | 227.6 |

1"×4" glass plates were coated with the primer compositions of Examples 14 and 15 by dipping into the primer to form a coating approximately 5 mils thick. ¼" wide beads of a moisture-curable polyurethane sealant such as that described in aforementioned U.S. Pat. No. 3,779,794 were laid down parallel to the 1" side across the primed face of the glass plate. The glass plates were then bonded in pairs to form a "sandwich" having a one-inch overlap of the bonded faces.

Adhesion of the bonded plates was tested on an "Instron" machine at 600 psi after 48 hours, after one week of curing at room temperature, and after one week of curing at room temperature followed by the following tests:

(1) Exposure in a humidity chamber for 6 weeks at 38° C. and 100% relative humidity;

(2) Exposure to ultraviolet light for 2,000 hours at 180° F. and 100% relative humidity followed by soaking in water at room temperature for 24 hours.

In each case, when tested, the bonded samples showed adhesive failure through the sealant. That is, the adhesive bond of the primer to the glass substrate and to the sealant in each case remained intact.

What is claimed is:

1. A "one-pot" moisture-curable coating composition comprising a first component having at least one isocyanate group and at least one hydrolyzable alkoxysilane group therein, and a second component which is a polymer having a plurality of oxazolidine groups therein, said first component being the reaction product of a polyol having an average of n hydroxy groups per molecule, where n is at least two, with an isocyanato functional alkoxysilane having from 1 to 3 hydrolyzable alkoxy groups therein and with an organic polyisocyanate.

2. A coating composition as in claim 1 wherein approximately (n−1) hydroxy groups of said polyol are reacted with said isocyanato functional alkoxysilane and wherein the other hydroxy groups in said polyol are reacted with said organic polyisocyanate.

3. A coating composition as in claim 1 wherein said polymer having a plurality of oxazolidine groups therein is a polymer or copolymer of an oxazolidinylalkyl acrylate or methacrylate.

4. A composition as in claim 1 wherein said polyol is a linear polyether polyol.

5. A composition as in claim 1 wherein said polyol is a polyester polyol.

6. A composition as in claim 1 wherein said alkoxysilane has the formula

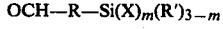

wherein R is a divalent organic group, R' is hydrogen or alkyl having 1 to 4 carbon atoms, X is a hydrolyzable alkoxy group having 1 to 4 carbon atoms, and m is an integer from 1 to 3.

7. A composition as in claim 6 wherein said alkoxysilane is a gamma-isocyanatopropyl trialkoxysilane.

8. A composition as in claim 1 wherein said polyisocyanate is prepared by cyclizing isophorone diisocyanate to form a polyisocyanate containing an isocyanurate ring and having a functionality between 3 and 4.

9. A composition as in claim 1 wherein said polymer having a plurality of oxazolidine groups is a copolymer of 2-(1,3-oxazolidin-3-yl)ethyl methacrylate and at least one member selected from the group consisting of alkyl acrylates and alkyl methacrylates having from 1 to 18 carbon atoms in the alkyl portion thereof.

* * * * *